(12) United States Patent
Shu et al.

(10) Patent No.: US 9,617,480 B2
(45) Date of Patent: Apr. 11, 2017

(54) PROCESS FOR MAKING IMPROVED ZEOLITE CATALYSTS FROM PEPTIZED ALUMINAS

(75) Inventors: Yuying Shu, Ellicott City, MD (US); Richard F. Wormsbecher, Dayton, MD (US); Wu-Cheng Cheng, Ellicott City, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 444 days.

(21) Appl. No.: 13/578,511

(22) PCT Filed: Mar. 1, 2011

(86) PCT No.: PCT/US2011/026637
§ 371 (c)(1),
(2), (4) Date: Aug. 10, 2012

(87) PCT Pub. No.: WO2011/115745
PCT Pub. Date: Sep. 22, 2011

(65) Prior Publication Data
US 2013/0005565 A1    Jan. 3, 2013

Related U.S. Application Data

(60) Provisional application No. 61/315,304, filed on Mar. 18, 2010.

(51) Int. Cl.
*B01J 29/06* (2006.01)
*C10G 11/05* (2006.01)
*B01J 29/40* (2006.01)
*B01J 29/08* (2006.01)
*B01J 29/70* (2006.01)
*B01J 35/00* (2006.01)
*C10G 11/18* (2006.01)
*B01J 37/00* (2006.01)

(52) U.S. Cl.
CPC .......... *C10G 11/05* (2013.01); *B01J 29/061* (2013.01); *B01J 29/082* (2013.01); *B01J 29/084* (2013.01); *B01J 29/088* (2013.01); *B01J 29/405* (2013.01); *B01J 29/7049* (2013.01); *B01J 35/002* (2013.01); *B01J 37/0045* (2013.01); *C10G 11/18* (2013.01); *B01J 37/0009* (2013.01); *B01J 2229/18* (2013.01); *B01J 2229/183* (2013.01); *B01J 2229/42* (2013.01)

(58) Field of Classification Search
USPC ............................. 502/63, 64, 65, 77, 78, 79
See application file for complete search history.

(56) References Cited

U.S. PATENT DOCUMENTS

| 3,293,192 | A | 12/1966 | Maher et al. | 252/430 |
|---|---|---|---|---|
| 3,338,672 | A | 8/1967 | Haden | 23/112 |
| 3,367,886 | A | 2/1968 | Haden et al. | 252/455 |
| 3,436,357 | A | 4/1969 | Plank et al. | 502/65 |
| 3,459,680 | A | 8/1969 | Plan et al. | 502/65 |
| 3,515,511 | A | 6/1970 | Flank et al. | 23/112 |
| 3,574,538 | A | 4/1971 | McDaniel | 23/112 |
| 3,733,391 | A | 5/1973 | Hoffman | 423/118 |
| 3,930,987 | A | 1/1976 | Grand | 208/111 |
| 3,939,246 | A | 2/1976 | Rollmann | 423/118 |
| 4,086,187 | A | 4/1978 | Lim et al. | 252/455 |
| 4,166,099 | A | 8/1979 | McDaniel | 423/329 |
| 4,206,085 | A | 6/1980 | Lim et al. | 252/455 |
| 4,302,622 | A | 11/1981 | Chu | 585/467 |
| 4,308,129 | A | 12/1981 | Gladrow et al. | 208/120 |
| 4,343,723 | A | 8/1982 | Rogers et al. | 252/455 |
| 4,374,294 | A | 2/1983 | Chu | 585/466 |
| 4,399,059 | A | 8/1983 | Chu | 502/73 |
| 4,405,443 | A | 9/1983 | Bertolacini et al. | 208/113 |
| 4,450,443 | A | 5/1984 | Dolland | |
| 4,493,902 | A | 1/1985 | Brown et al. | 502/65 |
| 4,542,116 | A | 9/1985 | Bertolacini et al. | 502/65 |
| 4,631,262 | A | 12/1986 | Altomare | 502/65 |

(Continued)

FOREIGN PATENT DOCUMENTS

| CN | 1064499 A | 9/1992 |
|---|---|---|
| CN | 101143334 A | 3/2008 |

(Continued)

OTHER PUBLICATIONS

American Chemical Society Symposium Series, Contaminant-Metal Deactivation and Metal-Dehydrogenation Effects During Cyclic Propylene Steaming of Fluid Catalytic Cracking Catalysts, No. 634, Chapter 12, pp. 171-183 (1996) by L.T. Boock, T.F. Petti, and J.A. Rudesill.

Breck, D.W., "Zeolite Molecular Sieves", Structural Chemistry & Use (1974) p. 94.

Sadeghbeigi, Fluid Catalytic Cracking Handbook, Gulf Publ. Co. Houston, 1995, ISBN 0-88415-290-1.

G. W. Young, G.D. Weatherbee, and S.W. Davey, "Simulating Commercial FCCU Yields With the Davison Circulating Riser (DCR) Pilot Plant Unit," National Petroleum Refiners Association (NPRA) Paper AM88-52.

(Continued)

*Primary Examiner* — Elizabeth Wood
(74) *Attorney, Agent, or Firm* — Charles A. Cross; Beverly J. Artale

(57) ABSTRACT

This invention relates to a process of preparing a catalyst from zeolite and peptized alumina. The invention comprises adding a yttrium compound to the zeolite, either prior to, during, or after its combination with the peptized alumina. The yttrium compound can be added to the zeolite via exchange of yttrium onto the zeolite prior to addition of peptized alumina, or the yttrium can be added as a soluble salt during the combination of the zeolite and peptized alumina. In either embodiment, the zeolite catalyst is then formed from the zeolite, yttrium and peptized alumina, optionally containing other inorganic oxide. This invention is suitable for preparing fluid cracking catalysts.

28 Claims, No Drawings

(56) References Cited

U.S. PATENT DOCUMENTS

| | | | |
|---|---|---|---|
| 4,664,780 A * | 5/1987 | Lochow et al. | 208/120.01 |
| 4,764,269 A | 8/1988 | Edwards et al. | 208/120 |
| 4,793,827 A | 12/1988 | Lochow et al. | 44/65 |
| 4,965,233 A | 10/1990 | Speronello | 502/65 |
| 5,008,225 A | 4/1991 | Magistro et al. | 502/73 |
| 5,071,806 A | 12/1991 | Pecoraro | 502/68 |
| 5,082,815 A | 1/1992 | Macedo | 502/68 |
| 5,085,762 A | 2/1992 | Absil | 208/120 |
| 5,194,413 A | 3/1993 | Kumar | 502/65 |
| 5,227,352 A | 7/1993 | Tsujii et al. | 502/65 |
| 5,258,341 A | 11/1993 | Chitnis et al. | 502/68 |
| 5,395,809 A | 3/1995 | Madon | 502/68 |
| 5,716,896 A | 2/1998 | Knifton et al. | 502/113 |
| 5,891,326 A | 4/1999 | Shi | 209/166 |
| 5,908,547 A | 6/1999 | Chitnis et al. | 208/120.01 |
| 5,997,728 A | 12/1999 | Adewuyi et al. | 208/120.01 |
| 6,030,916 A | 2/2000 | Choudary et al. | 502/65 |
| 6,069,012 A | 5/2000 | Kayser | 436/37 |
| 6,114,267 A | 9/2000 | Ghosh et al. | 502/68 |
| 6,635,169 B1 | 10/2003 | Bhore et al. | 208/120.2 |
| 6,656,347 B2 | 12/2003 | Stockwell et al. | 208/120.01 |
| 6,670,296 B2 | 12/2003 | Labarge et al. | 502/69 |
| 6,716,338 B2 | 4/2004 | Madon et al. | 208/120.01 |
| 6,906,232 B2 | 6/2005 | Levin | 585/638 |
| 7,015,175 B2 | 3/2006 | Vassilakis et al. | 502/217 |
| 7,033,487 B2 | 4/2006 | O'Connor et al. | 208/120.01 |
| 7,125,817 B2 | 10/2006 | Ou | 502/64 |
| 7,160,830 B2 | 1/2007 | Van Der Zon et al. | 502/8 |
| 7,208,446 B2 | 4/2007 | Stamires et al. | 502/355 |
| 7,319,178 B2 | 1/2008 | Levin et al. | 585/640 |
| 7,405,336 B2 | 7/2008 | Kelly et al. | 585/400 |
| 7,442,664 B2 | 10/2008 | Van De Zon | 502/63 |
| 7,641,787 B2 | 1/2010 | Yaluris et al. | |
| 7,663,011 B2 | 2/2010 | Shan et al. | 585/533 |
| 7,863,212 B2 | 1/2011 | Wakui | 502/73 |
| 7,902,106 B2 | 3/2011 | Hu et al. | |
| 2005/0042158 A1* | 2/2005 | Yaluris et al. | 423/239.1 |
| 2005/0100494 A1* | 5/2005 | Yaluris et al. | 423/235 |
| 2005/0101818 A1* | 5/2005 | Levin | B01J 21/06 585/639 |
| 2009/0050527 A1* | 2/2009 | Krishnamoorthy et al. | 208/120.05 |
| 2009/0215613 A1 | 8/2009 | Hagemeyer | 502/304 |
| 2010/0252484 A1* | 10/2010 | Kumar et al. | 208/120.15 |
| 2012/0329639 A1 | 12/2012 | Shu et al. | |
| 2013/0001134 A1* | 1/2013 | Shu et al. | 208/120.01 |

FOREIGN PATENT DOCUMENTS

| | | | |
|---|---|---|---|
| CN | 101455979 | 6/2009 | |
| EP | 0409332 | 1/1991 | C07D 249/10 |
| GB | 1483244 | 8/1977 | B01J 29/06 |
| WO | 92/01886 | 2/1992 | C30B 15/12 |
| WO | 9201826 | 2/1992 | |
| WO | 94/15875 | 7/1994 | C01B 33/34 |

OTHER PUBLICATIONS

G. W. Young, "Realistic Assessment of FCC Catalyst Performance in the Laboratory,"in Fluid Catalytic Cracking: Science and Technology, J. S. Magee and M. M. Mitchell, Jr. Eds., Studies in Surface Science and Catalysis, vol. 76, p. 257, Elsevier Science Publishers B.V., Amsterdam 1993, ISBN 0-444-89037-8.

"Commercial Preparation and Characterization of FCC Catalysts", Fluid Catalytic Cracking: Science and Technology, Studies in Surface Science and Catalysis, vol. 76, p. 120 (1993).

Krishna, Sadeghbeigi, op cit & Scherzer, "Octane Enhancing Zeolitic FCC Catalysts", Marcel Dekker, New York, 1990, ISBN 0-8247-8399-9, pp. 165-t78.

Venuto and Habib, Fluid Catalytic Cracking with Zeolite Catalysts, Marcel Dekker, New York t979, ISBN 0-8247-6870-1.

Johnson, MFL., "Estimation of the Zeolite Content of a Catalyst from Nitrogen Adsorption Isotherms", Journal of Catalysis 52, pp. 425-431 (1978).

Morgado, Edisson et al. "Characterization of Peptized Boehmite Systems: An 27 Al Nuclear Magnetic Resonance Study." Journal of Colloid and Interface Science. 176 (1995): 432-441.

Brindley et al., The Kaoiinite-Mullite Reaction Series, Journal of the American Ceramic Society, vol. 42, No. 7 (1959) pp. 311 et al.

Duncan et al., Kinetics and Mechanism of High Temperature Reactions of Kaolinite Minerals, Journal of the American Cermic Society, vol. 52, No. 2, (1969) pp. 74 et al.

* cited by examiner

PROCESS FOR MAKING IMPROVED ZEOLITE CATALYSTS FROM PEPTIZED ALUMINAS

CROSS-REFERENCE TO RELATED APPLICATIONS

This application claims the benefit of the filing date of International Patent Application No. PCT/US2011/026637 filed Mar. 1, 2011, which claims priority and the benefit of U.S. Provisional Patent Application No. 61/315,304 filed Mar. 18, 2010, the disclosure of which is hereby incorporated herein by reference.

FIELD OF THE INVENTION

The present invention relates to a process of making zeolite-containing catalysts using peptized aluminas. The process is particularly relevant for making catalysts suitable for use in fluid catalytic cracking processes. The invention further relates to reducing loss of zeolite surface area and improved attrition resistance when the catalyst is used in fluid catalytic cracking processes.

BACKGROUND OF THE INVENTION

Catalytic cracking is a petroleum refining process that is applied commercially on a very large scale. A majority of the refinery petroleum products are produced using the fluid catalytic cracking (FCC) process. An FCC process typically involves the cracking of heavy hydrocarbon feedstocks to lighter products by contacting the feedstock in a cyclic catalyst recirculation cracking process with a circulating fluidizable catalytic cracking catalyst inventory consisting of particles having a mean particle size ranging from about 20 to about 150 µm, preferably from about 50 to about 100 µm.

The catalytic cracking occurs when relatively high molecular weight hydrocarbon feedstocks are converted into lighter products by reactions taking place at elevated temperature in the presence of a catalyst, with the majority of the conversion or cracking occurring in the vapor phase. The feedstock is converted into gasoline, distillate and other liquid cracking products as well as lighter gaseous cracking products of four or less carbon atoms per molecule. The gas partly consists of olefins and partly of saturated hydrocarbons. Bottoms and coke are also produced. The cracking catalysts typically are prepared from a number of components, each of which is designed to enhance the overall performance of the catalyst. FCC catalysts are generally composed of zeolite, active matrix, clay and binder with all of the components incorporated into a single particle.

Alumina is an inorganic oxide based active matrix used in FCC catalysts. See U.S. Pat. Nos. 4,086,187; 4,206,085; and 4,308,129. Alumina hydrate is typically used for this purpose, with boehmite or microcrystalline boehmite, also called pseudoboehmite, frequently used. The alumina can be further treated with acid to improve the properties of resulting alumina matrix once the final catalyst is formed. The acid is added in concentration up to 2 moles of acid equivalence per mole of $Al_2O_3$, primarily to improve attrition resistance. Treating alumina with acid in this fashion is also commonly known as "peptizing".

Other components utilized in FCC catalysts prepared from peptized aluminas can include rare earth such as lanthanum or cerium. See the '187 and '085 patents above. It is also taught, however, that such catalysts should be substantially free of rare earth metals, and other elements such as yttrium. See the aforementioned '129 patent, and in particular Column 4, lines 11-22 thereof.

It is believed however that adding zeolites to an acidified alumina leads to degradation of the zeolite structure during manufacture of the catalyst and during use in a FCC process. In particular it is believed that the lower pH in catalyst preparation slurries containing peptized aluminas lead to leaching of alumina from the silica alumina structures of the zeolite, thereby leading to collapse of the zeolite structure and loss of surface area. Loss of surface leads to loss in cracking activity, and therefore requiring more frequent replacement of catalyst inventory.

SUMMARY OF THE INVENTION

It has been discovered that adding yttrium can improve retention of zeolite surface area when using peptized alumina to manufacture a zeolite-containing catalyst. The process for making the catalyst comprises:
  (a) combining peptized alumina, yttrium compound, and zeolite, and
  (b) forming an alumina-containing catalyst from the combination in (a).

Acids, such as monovalent acids, including, but not limited to, formic acid, nitric acid, acetic acid, hydrochloric acid, and/or a mixture thereof, are particularly suitable sources of acid for peptizing alumina, e.g., hydrated alumina, and more suitably pseudoboehmite or boehmite.

The alumina and acid can be combined to form the peptized alumina and the peptized alumina is then combined with the yttrium compound, zeolite, and optional inorganic oxide, or alumina and acid can be added during the time at which an acid stable zeolite and yttrium are added, and peptized alumina can form in situ in the presence of the zeolite and yttrium.

Other embodiments of the invention include processes in which the yttrium compound and zeolite are introduced to the process as yttrium cations exchanged on zeolite.

Water soluble yttrium salts are particularly suitable for use in this invention, and can be added to the zeolite, e.g., via cation exchange, prior to combining the zeolite with the peptized alumina, or the yttrium can be added during combination of the zeolite with the peptized alumina. The yttrium exchanged zeolite of the former method can optionally be further dried and steamed to make an ultrastable zeolite Y. Indeed, the manufacture of peptized alumina-based catalysts containing zeolite Y, and in particular zeolite USY, would particularly benefit from this invention.

The yttrium compound may further include rare earth, in which case suitable embodiments of the invention may include rare earth in a ratio by weight of 0.01 to 1 rare earth to yttrium, the rare earth and yttrium measured as oxide.

Inorganic oxide other than alumina can also be added to the zeolite, yttrium compound and peptized alumina as further matrix material and/or binder.

The invention therefore provides a useful method of reducing loss of zeolite surface area in a zeolite containing catalyst prepared from peptized alumina, and in a form suitable for fluidized catalytic cracking, the method comprising
  (a) forming peptized alumina,
  (b) adding yttrium compound to a zeolite,
  (c) adding peptized alumina to the zeolite before, during, and/or after addition of the yttrium compound to the zeolite, and (d) forming a catalyst suitable for fluidized catalytic cracking.

These and other aspects of the present invention are described in further details below.

DETAILED DESCRIPTION OF THE INVENTION

It has been found that adding yttrium to a zeolite results in retention of zeolite surface area when the zeolite is combined with peptized aluminas to make a zeolite catalyst. It has also been found that the attrition resistance of the catalyst can be enhanced if the yttrium is added to a combination of the zeolite, peptized alumina, and optional components rather than added as cation exchanged on the zeolite.

Yttrium is commonly found in rare earth ores and has been occasionally referred to as a rare earth metal. Yttrium, however, is not considered a rare earth metal itself. The element yttrium has an atomic number of 39 and therefore does not lie in the rare earth element grouping on the elemental period table, which have atomic numbers from 57 to 71. The metals within this range of atomic numbers include lanthanum (atomic number 57) and lanthanide metals. See, *Hawley's Condensed Chemical Dictionary*, 11$^{th}$ Edition, (1987). The term "rare earth" or "rare earth oxide" is therefore used hereinafter to mean lanthanum and lanthanide metals, or their corresponding oxides.

The term "yttrium compound" is used herein to designate not only yttrium that is in the form of a compound such as a yttrium salt, but also in the form of a yttrium cation such as that exchanged on zeolite. The term "yttrium compound" and the term "yttrium" are used interchangeably unless stated otherwise. Unless expressed otherwise herein, weight measurements of yttrium or a yttrium compound refer to that reported as yttrium oxide ($Y_2O_3$) in elemental analysis techniques conventionally used in the art, including but not limited to, inductively coupled plasma (ICP) analytical methods.

For purposes of the invention, the term "zeolite surface area" is used herein to refer to surface area in $m^2/g$ from a zeolite or microporosity less than 20 Angstroms.

For purposes of the present invention, the term "peptized alumina" is used herein to designate aluminas that have been treated with acid in a manner that fully or partially breaks up the alumina into a particle size distribution with an increased number of particles that are less than one micron in size. Peptizing typically results in a stable suspension of particles having increased viscosity. See Morgado et. al., "Characterization of Peptized Boehmite Systems: An $^{27}Al$ Nuclear Magnetic Resonance Study", J. Coll. Interface Sci., 176, 432-441 (1995). Peptized alumina dispersions typically have an average particle size less than that of the starting alumina, and are typically prepared using acid concentrations described later below.

The present invention preferably forms a catalyst capable of being maintained within a FCC unit. FCC catalysts typically contain zeolite, which is a fine porous powdery material composed of the oxides of silicon and aluminum. The zeolites are typically incorporated into matrix and/or binder and particulated. See "Commercial Preparation and Characterization of FCC Catalysts", *Fluid Catalytic Cracking: Science and Technology*, Studies in Surface Science and Catalysis, Vol. 76, p. 120 (1993). When the aforementioned zeolite particulates are aerated with gas, the particulated catalytic material attains a fluid-like state that allows the material to behave like a liquid. This property permits the catalyst to have enhanced contact with the hydrocarbon feedstock feed to the FCC unit and to be circulated between the FCC reactor and the other units of the overall FCC process (e.g., regenerator). Hence, the term "fluid" has been adopted by the industry to describe this material. FCC catalysts typically have average particle sizes in the range of about 20 to about 150 microns. While the compositions made by this invention have shown to be particularly suitable for use in FCC, it is envisioned that the composition made by this invention also can be used in other catalytic hydrocarbon conversion processes utilizing peptized based zeolite catalyst where it is desirable to retain zeolite surface area of the catalyst, and/or have improved attrition resistant catalysts.

Zeolite

The zeolite utilized in this invention can be any zeolite having catalytic activity in a hydrocarbon conversion process. Generally, the zeolites can be large pore size zeolites that are characterized by a pore structure with an opening of at least 0.7 nm and medium or intermediate pore size zeolites having a pore size smaller than 0.7 nm but larger than about 0.56 nm. Suitable large pore zeolites are described further below. Suitable medium pore size zeolites include pentasil zeolites such as ZSM-5, ZSM-22, ZSM-23, ZSM-35, ZSM-50, ZSM-57, MCM-22, MCM-49, MCM-56 all of which are known materials.

Suitable large pore zeolites comprise crystalline aluminosilicate zeolites such as synthetic faujasite, i.e., type Y zeolite, type X zeolite, and Zeolite Beta, as well as heat treated (calcined) derivatives thereof. Zeolites that are particularly suited include ultra stable type Y zeolite (USY) as disclosed in U.S. Pat. No. 3,293,192. As is discussed in more detail below, a yttrium exchanged Y zeolite is particularly preferred. The zeolite of this invention may also be blended with molecular sieves such as SAPO and ALPO as disclosed in U.S. Pat. No. 4,764,269. The above zeolites that have been pre-exchanged with rare earth may also be used with this invention, although they are not preferred, especially those zeolites that have undergone extensive rare earth exchange.

Standard Y-type zeolite is commercially produced by crystallization of sodium silicate and sodium aluminate. This zeolite can be converted to USY-type by dealumination, which increases the silicon/aluminum atomic ratio of the parent standard Y zeolite structure. Dealumination can be achieved by steam calcination or by chemical treatment.

The unit cell size of a preferred fresh Y-zeolite is about 24.45 to 24.7 Å. The unit cell size (UCS) of zeolite can be measured by X-ray analysis under the procedure of ASTM D3942. There is normally a direct relationship between the relative amounts of silicon and aluminum atoms in the zeolite and the size of its unit cell. This relationship is fully described in Zeolite Molecular Sieves, Structural Chemistry and Use (1974) by D. W. Breck at Page 94, which teaching is incorporated herein in its entirety by reference. Although both the zeolite, per se, and the matrix of a fluid cracking catalyst usually contain both silica and alumina, the $SiO_2/Al_2O_3$ ratio of the catalyst matrix should not be confused with that of the zeolite. When an equilibrium catalyst is subjected to x-ray analysis, it only measures the UCS of the crystalline zeolite contained therein.

The unit cell size value of a zeolite also decreases as it is subjected to the environment of the FCC regenerator and reaches equilibrium due to removal of the aluminum atoms from the crystal structure. Thus, as the zeolite in the FCC inventory is used, its framework Si/Al atomic ratio increases from about 3:1 to about 30:1. The unit cell size correspondingly decreases due to shrinkage caused by the removal of aluminum atoms from the cell structure. The unit cell size of a preferred equilibrium Y zeolite is at least 24.22 Å, preferably from 24.28 to 24.50 Å, and more preferably from 24.28 to 24.38 Å.

The zeolite can be one capable of being exchanged with yttrium. As described in more detail below, yttrium exchanged zeolites that can be used in the invention are prepared by ion exchange, during which sodium atoms present in the zeolite structure are replaced with yttrium cations, preferably prepared from yttrium rich compounds. The yttrium compound used to conduct the exchange may also be mixed with rare-earth metal salts such as those salts of cerium, lanthanum, neodyminum, naturally occurring rare-earths and mixtures thereof. It is particularly preferable for embodiments utilizing yttrium exchanged zeolite that the yttrium exchange bath consist essentially of yttrium, preferably with no more than 50% by weight rare earth (as oxide) present in the yttrium compound, and more preferably no more than 25% by weight. The yttrium exchanged zeolites may be further treated by drying and calcination (e,g., in steam), using a process utilized to make conventional ultrastable zeolite Y (USY).

It is also preferred that the addition of divalent metal cations to the zeolite be minimized. Without being bound by a particular theory, it is believed that minimizing the presence of such metals, e.g., zinc, reduces formation of detrimental reaction products or species that form between the metal and peptized alumina and deposit on the zeolite structure. Minimizing these metals thereby enhances the zeolite stabilization effect of the yttrium compound. It is therefore preferred that the catalyst made using this invention contain no more than 1% by weight divalent metal (measured as an oxide) based on the zeolite, preferably no more than 0.5% by weight divalent metal based on the zeolite. The alumina, zeolite, yttrium and optional components should therefore be selected to minimize the presence of such metals.

Yttrium

Yttrium can be present in the composition in amounts ranging from about 0.5 to about 15% by weight, measured as an oxide ($Y_2O_3$), of the zeolite. The specific amount of yttrium for a particular embodiment depends on a number of factors, including, but not limited to, the ion exchange capacity of the selected zeolite in embodiments utilizing yttrium exchanged zeolite. It however can also depend on the acidity of the peptized alumina, and how much yttrium is needed to achieve the desired stabilization.

The amount of yttrium in the formed catalyst can also be measured as an oxide in amounts measured in grams per square meter of catalyst surface area. For example, the aforementioned yttrium can each be present in amounts of at least about 5 µg/m$^2$ of total catalyst surface area. More typically, yttrium can be found in amounts of at least about 20 µg/m$^2$. The weight and surface area are measured, respectively, by ICP and BET surface area methodologies.

It is generally desirable for yttrium to be located within the pores of the zeolite, which the embodiment described above with respect to exchanging yttrium onto zeolite readily does. When doing so, it is also possible that a portion of the yttrium could also be located within pores of the catalyst matrix after the zeolite is combined with matrix precursors. The presence of yttrium in the catalyst matrix is also found when utilizing another embodiment of the invention in which yttrium compound is added to the zeolite in a slurry of zeolite, peptized alumina, and optional components that is then processed to form the final catalyst material. In those instances the yttrium can be in the matrix in amounts up to about 25% of the yttrium present in the composition. Indeed, it has been found that when yttrium is added as a soluble salt to the zeolite, peptized alumina, and the other aforementioned components, the attrition resistance (as measured by the Davison Index or "DI") of the finished catalyst is unexpectedly improved.

Yttrium can be added to a combination or mixture of zeolite and peptized alumina using soluble yttrium salts, which include yttrium halides (e.g., chlorides, fluorides, bromides and iodides), nitrates, acetates, bromates, iodates, and sulfates. Water soluble salts, and aqueous solutions thereof, are particularly suitable for use in this invention. Acid soluble compounds, e.g., yttrium oxide, yttrium hydroxide, yttrium fluoride and yttrium carbonate, are also suitable for embodiments in which the salt is added with acid, e.g., when acid and alumina are combined with acid stable zeolite and peptized alumina is formed in situ.

The soluble salts of this embodiment are added as solution having an yttrium concentration in the range of 1 to about 40% by weight (as oxide), possibly containing rare earth oxide present in a ratio of in the range of 0.01 to 1 rare earth oxide to yttrium oxide. The ratio of rare earth to yttrium in such embodiments can preferably be in the range of 0.05 to 0.5. It is preferred that the amount of rare earth added to the catalyst comprise no more than 5% by weight (measured as oxide) of the zeolite.

The aforementioned yttrium-containing solutions can be used with a number of embodiments of the invention. They are not only suitable when adding yttrium to zeolite that is combined peptized alumina and optional precursors, but also suitable as an exchange bath for embodiments in which yttrium is added as a cation exchanged on the zeolite.

Peptized Alumina

Peptized aluminas suitable for making catalysts, and in particular for making FCC catalysts, are known. See for example, U.S. Pat. Nos. 7,208,446; 7,160,830; and 7,033,487. See also, Morgando et al., supra. Peptized alumina herein specifically refer to those peptized with an acid and may also be called "acid peptized alumina". Acid peptized alumina is based on or prepared from an alumina capable of being peptized, and include those known in the art as having high peptizability indices. See U.S. Pat. No. 4,086,187; or alternatively those aluminas described as peptizable in U.S. Pat. No. 4,206,085.

Suitable aluminas for making peptized alumina include those described in column 6, line 57 through column 7, line 53 of U.S. Pat. No. 4,086,187, the contents of which are incorporated by reference. For example, a suitable alumina includes a hydrated form of alumina that comprises a substantial proportion above 25% gelatinous aluminum monohydrate (AlOOH), and preferably an alumina that comprises essentially all aluminum monohydrate. Pseudoboehmite or boehmite alumina is a particularly suitable alumina falling in this category of aluminas Suitable aluminas include those commercially available as the Catapal™ aluminas from Sasol, or Versal™ aluminas from UOP. Methods of preparing such aluminas are known and described in the aforementioned '187 patent.

The selected alumina is "peptized" by acidifying it in aqueous medium. For example, 1 part of the alumina, on dry basis, is mixed under agitation with about 1 to 50 parts aqueous solution containing about 0.01 to about 2 mole equivalents of acid per mole of alumina ($Al_2O_3$). In certain embodiments, the mixture of acid and alumina is mixed vigorously, including being milled, and/or heated, for a time sufficient to form a stable suspension as described above.

The acid used is one suitable for peptizing the alumina Monovalent acids are particularly suitable, and include, but are not limited to, formic, nitric, hydrochloric, acetic acids, and/or mixture of two or more acids.

Typically, the average particle size of peptized aluminas suitable for this invention is in the range of 0.01 micron to 5 microns.

It is envisioned that the invention can be carried out by adding acid directly to certain zeolites, yttrium, selected alumina, and optional components, wherein the alumina is peptized in situ when mixing the other components. This would be suitable for certain acid stable zeolites, such as ZSM-5. It however is preferred to carry out the invention by adding the zeolite, yttrium and optionally other components to peptized alumina. The addition sequence of the three components is not critical, and peptized alumina can be added before, during or after the addition of yttrium compound. Peptized alumina may also be added in two or more steps such that it is adding before, during and after during the process, provided it is done so before forming catalyst.

Optional Components

The peptized alumina generally serves as a matrix for the finished catalyst. A catalyst prepared in accordance with the invention, however, can comprise additional inorganic oxide components that also serve as matrix and/or that can serve other functions, e.g., binder and metals trap. Suitable additional inorganic oxide components include, but are not limited to, unpeptized bulk alumina, silica, porous alumina-silica, and kaolin clay. The peptized alumina and optional inorganic oxide may form all or part of an active-matrix component of the catalyst. By "active" it is meant the material has activity in converting and/or cracking hydrocarbons in a typical FCC process.

Suitable binders include those materials capable of binding the matrix and zeolite into particles. Specific suitable binders include, but are not limited to, alumina sols, silica sols, aluminas, and silica aluminas.

Process of Making the Catalyst

The process for this invention comprises combining the alumina, acid suitable for peptizing the alumina, zeolite, yttrium compound and optionally additional inorganic oxide. Such processes include, but are not necessarily limited to, the following specific processes.

(1) Ion exchanging a selected zeolite first with yttrium (optionally drying and calcining) and then combining the ion exchanged zeolite with the peptized alumina, and optional components mentioned earlier and forming a catalyst therefrom.

(2) Combining the zeolite, yttrium, peptized alumina, and optional components, simultaneously or in any sequence, and forming the desired catalyst.

(3) Peptizing the alumina, and then adding the same to a zeolite that has been ion exchanged with yttrium, and forming the desired catalyst.

(4) Peptizing the alumina, and then adding the same, simultaneously or in any sequence, to zeolite, yttrium, and optional components, and forming the desired catalyst.

When manufacturing FCC catalysts, spray drying is one process that can be used in any of the above-described methods to form the catalyst. Spray drying conditions are known in the art. For example, after combining the yttrium exchanged zeolite of (1) with the peptized alumina and any optional components in water, the resulting slurry can be spray dried into particles having an average particle size in the range of about 20 to about 150 microns.

As mentioned earlier, the source of yttrium in any of the above methods is generally in the form of an yttrium salt, and includes, but is not limited to yttrium halides such as chlorides, bromides, iodides, and fluorides. Yttrium sulfate, nitrates, carbonates, acetates, bromates, iodates, and sulfates are also suitable sources. The source of the yttrium is usually aqueous based and yttrium can be present at concentrations of about 1 to about 30% measured as oxide. Yttrium oxide and hydroxide, each of which is soluble in acid, are also suitable yttrium compounds.

If the yttrium source is from a rare earth ore, salts of rare earth may also be present in the yttrium compound and/or yttrium exchange bath. As mentioned earlier, it is preferable that the yttrium compound consistent essentially of yttrium containing moieties, and any amount of rare earth is minimal and preferably present in amounts so that no more than 5% by weight (as an oxide) based on the zeolite is present in the catalyst.

In the instance that matrix and binder are included as optional components, these materials are added to the mixture as dispersions, solids, and/or solutions. A suitable clay matrix comprises kaolin. Suitable materials for binders include inorganic oxides, such as alumina, silica, silica-alumina, aluminum phosphate, as well as other metal-based phosphates known in the art. Silica sols such as Ludox® colloidal silica available from W. R. Grace & Co.-Conn. and ion exchanged water glass are suitable binders. Certain binders, e.g., those formed from binder precursors, e.g., aluminum chlorohydrol, are created by introducing solutions of the binder's precursors into the mixer, and the binder is then formed upon being spray dried and/or further processed.

For example, it is optional to wash the catalyst to remove excess alkali metal, which are known contaminants to catalysts, especially FCC catalysts. The catalyst can be washed one or more times, preferably with water, ammonium hydroxide, and/or aqueous ammonium salt solutions, such as ammonium sulfate solution. The washed catalyst is separated from the wash slurry by conventional techniques, e.g. filtration, and dried to lower the moisture content of the particles to a desired level, typically at temperatures ranging from about 100° C. to 300° C. For example, one embodiment comprises drying the catalyst using spray drying, wherein the inlet temperature of the spray drier can be in the range of 220° C. to 540° C., and the outlet temperature is in the range of 130° C. to 180° C.

A spray dried catalyst is then ready as a finished catalyst "as is", or it can be calcined for activation prior to use. The catalyst particles, for example, can be calcined at temperatures ranging from about 250° C. to about 800° C. for a period of about 10 seconds to about 4 hours. Preferably, the catalyst particles are calcined at a temperature of about 350° C. to 600° C. for about 10 seconds to 2 hours.

The invention prepares catalyst that can be used as a catalytic component of the circulating inventory of catalyst in a catalytic cracking process, e.g., an FCC process. For convenience, the invention will be described with reference to the FCC process although the present catalyst could be used in a moving bed type (TCC) cracking process with appropriate adjustments in particle size to suit the requirements of the process. Apart from the addition of the present catalyst to the catalyst inventory and some possible changes in the product recovery section, discussed below, the manner of operating a FCC process will not be substantially different.

The invention is however particularly suited for FCC processes in which a hydrocarbon feed will be cracked to lighter products by contact of the feed in a cyclic catalyst recirculation cracking process with a circulating fluidizable catalytic cracking catalyst inventory consisting of particles having a size ranging from about 20 to about 150 microns. The significant steps in the cyclic process are: (i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons; (ii) the effluent is discharged and separated, normally in one or more cyclones, into a vapor phase rich in cracked product and a solids rich phase comprising the spent catalyst; (iii) the vapor phase is removed as product and fractionated in the FCC main column and its associated side columns to form liquid cracking products including gasoline, (iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

Typical FCC processes are conducted at reaction temperatures of about 480° C. to about 570° C., preferably 520 to 550° C. The regeneration zone temperatures will vary depending on the particular FCC unit. As it is well known in the art, the catalyst regeneration zone may consist of a single or multiple reactor vessels. Generally, the regeneration zone temperature ranges from about 650 to about 760° C., preferably from about 700 to about 730° C.

The stripping zone can be suitably maintained at a temperature in the range from about 470 to about 560° C., preferably from about 510 to about 540° C.

Catalysts prepared from peptized alumina are from time to time employed in FCC processes conducted under the above conditions. Such catalysts, as with catalyst prepared from other matrices, are frequently added to the circulating FCC catalyst inventory while the cracking process is underway, or they may be present in the inventory at the start-up of the FCC operation. As will be understood by one skilled in the art, the catalyst particles may alternatively be added directly to the cracking zone, to the regeneration zone of the FCC cracking apparatus, or at any other suitable point in the FCC process.

This invention is particularly useful when making peptized alumina based zeolite catalysts, and it is submitted that the benefit of the invention is unexpected. The examples below show that when yttrium replaces rare earth as a component to the catalyst, and is added to a catalyst prepared from matrices other than peptized alumina, such as those prepared from aluminum chlorohydrol, the zeolite retention benefit is not shown when the catalyst is deactivated using standard deactivation protocol for evaluating catalyst activity and properties. Zeolite surface area retention in a peptized alumina-based catalyst, on the other hand, is significantly improved. Accordingly, it is submitted that the invention results in a peptized alumina based zeolite catalyst having unexpectedly more stable activity.

It is also shown below that the attrition resistance of the catalysts can be improved when adding the yttrium compound as a water soluble salt directly to the zeolite, peptized alumina, and optional components rather than preexchanging yttrium on the zeolite before addition to the peptized alumina.

Other catalytically active components may be present in the circulating inventory of catalytic material in addition to a cracking catalyst prepared by this invention and/or may be included with the invention when the invention is being added to a FCC unit. Examples of such other materials include the octane enhancing catalysts based on zeolite ZSM-5, CO combustion promoters based on a supported noble metal such as platinum, stack gas desulfurization additives such as DESOX® (magnesium aluminum spinel), vanadium traps, bottom cracking additives, such as those described in Krishna, Sadeghbeigi, op cit and Scherzer, "Octane Enhancing Zeolitic FCC Catalysts", Marcel Dekker, N.Y., 1990, ISBN 0-8247-8399-9, pp. 165-178 and gasoline sulfur reduction products such as those described in U.S. Pat. No. 6,635,169. These other components may be used in their conventional amounts.

It is also within the scope of the invention to use the cracking catalyst compositions of the invention alone or in combination with other conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type zeolite acid site active component, one or more matrix aluminas and/or silica aluminas, and clays, such as kaolin clay. The Y zeolite in such catalysts may be present in one or more forms and may have been ultra stabilized and/or treated with stabilizing cations such as any of the rare earths.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

The composition of yttrium solution and lanthanum solution used in the Examples below contain elements as indicated in Table 1 below. Each element is reported in Table 1 below as an oxide. The solutions are aqueous based, and contents of rare earth metal elements and yttrium is separately listed in Table 1.

The peptized alumina used in the Examples below was prepared by first mixing pseudoboehmite alumina (having an average particle size of about 10 microns) with 0.3 mole hydrochloric acid per mole of alumina ($Al_2O_3$) on a dry basis. The components were mixed until a well formed dispersion having a pH of 3 was formed. The resulting dispersion had an average particle size less than 5 microns.

TABLE 1

| Solution Content | YCl$_3$ Solution | LaCl$_3$ Solution |
|---|---|---|
| Y$_2$O$_3$, %: | 22.65 | 0.01 |
| La$_2$O$_3$, %: | 0.09 | 17.92 |
| CeO$_2$, %: | 0.05 | 3.42 |
| Na$_2$O, %: | 0.01 | 0.27 |
| Nd$_2$O$_3$, %: | 0.01 | 1.28 |
| Pr$_6$O$_{11}$, %: | 0.00 | 0.81 |
| Sm$_2$O$_3$, %: | 0.00 | 1.23 |

Example 1

Catalyst 1 is prepared from the yttrium solution and the peptized alumina described above. Aqueous solutions of 4735 grams (1141 g on a dry basis) of washed USY zeolite, 9375 grams (1500 g on a dry basis) of peptized alumina, 625 grams (250 g on a dry basis) of colloidal silica, 2353 grams (2000 g on a dry basis) of clay, and 322 grams (73 g on a dry basis) yttrium solution were added and mixed for about 10 minutes. The mixture was milled in a Drais mill to reduce particle size and spray dried in a Bowen spray dryer at an inlet temperature of 343° C. The spray dryer feed solids content is about 30% by weight. The spray dried particles were calcined at 399° C. Then the calcined particles were washed to lower Na$_2$O in an aqueous bath, then filtered and rinsed with deionized water.

Example 2

Catalyst 2 is prepared from the same lanthanum solution and peptized alumina described above. Aqueous solutions of 4735 grams (1141 g on a dry base) of the washed USY zeolite, 9375 grams (1500 g on a dry basis) of peptized alumina, 625 grams (250 g on a dry basis) of colloidal silica, 2353 grams (2000 g on a dry basis) of clay, and 389 grams (105 g on a dry basis) lanthanum solution were added and mixed for about 10 minutes. The mixture was milled in a Drais mill to reduce particle size and spray dried in a Bowen spray dryer at an inlet temperature of 343° C. The spray dryer feed solids content is about 30% by weight. The spray dried particles were calcined at 399° C. Then the calcined particles were washed to lower Na$_2$O in an aqueous solution, then filtered and rinsed with deionized water.

Example 3

Catalyst 3 is prepared from the yttrium solution described above and a commercially available boehmite alumina. Aqueous solutions of 5856 grams (1558 g on a dry basis) of the low soda USY zeolite, 3478 grams (800 g on a dry basis) of aluminum chlorohydrol, 947 grams (500 g on a dry basis) of boehmite alumina, 2471 grams (2100 g on a dry basis) of clay, and 307 grams (70 g on a dry basis) yttrium solution were added and mixed for about 10 minutes. The mixture was milled in a Drais mill to reduce particle size and spray dried in a Bowen spray dryer at an inlet temperature of 343° C. The spray dryer feed solids content is about 38% by weight. The spray dried particles were calcined for 1 hour at 593° C.

Example 4

Catalyst 4 is prepared from lanthanum solution described above and the boehmite alumina used in Example 3. Aqueous solutions of 5856 grams (1558 g on a dry basis) of the low soda USY zeolite, 3478 grams (800 g on a dry basis) of aluminum chlorohydrol binder, 947 grams (500 g on a dry basis) of boehmite alumina, 2471 grams (2100 g on a dry basis) of clay, and 370 grams (100 g on a dry basis) lanthanum solution were added and mixed for about 10 minutes. The mixture was milled in a Drais mill to reduce particle size and spray dried in a Bowen spray dryer at an inlet temperature of 343° C. The spray dryer feed solids content is about 38% by weight. The spray dried particles were calcined for 1 hour at 593° C.

Example 5

Catalysts 1 and 2 were deactivated using a CPS protocol known in the art. CPS means cyclic propylene steaming. See Lori T. Boock, Thomas F. Petti, and John A. Rudesill, *ACS Symposium Series,* 634, 1996, 171-183)

Protocols Used: CPS, with 1000 ppm Ni/2000 ppm V, as well as CPS with no metals.

The physical and chemical properties of the catalysts before and after the two methods of deactivation are listed in Table 2 below. It is seen that Catalyst 1 in each deactivation method has better zeolite surface area (ZSA) retention after deactivation as compared to Catalyst 2. The term "MSA" below refers to matrix surface area. "RE$_2$O$_3$" refers to total rare earth, including lanthanum oxide which is also separately listed.

TABLE 2

| Content | Catalyst 2 | Catalyst 1 |
|---|---|---|
| Al$_2$O$_3$, %: | 51.43 | 53.07 |
| Na$_2$O, %: | 0.18 | 0.19 |
| RE$_2$O$_3$, %: | 1.91 | 0.03 |
| La$_2$O$_3$, %: | 1.82 | 0.02 |
| Y$_2$O$_3$, %: | 0.04 | 1.34 |
| ABD, g/cm$^3$: | 0.76 | 0.74 |
| DI, -: | 5 | 1 |
| Pore Volume, cm$^3$/g: | 0.38 | 0.37 |
| Surface Area, m$^2$/g: | 286 | 286 |
| MSA, m$^2$/g: | 124 | 121 |
| ZSA, m$^2$/g: | 162 | 165 |
| After CPS No Metals | | |
| Surface Area, m$^2$/g: | 183 | 194 |
| MSA, m$^2$/g: | 82 | 85 |
| ZSA, m$^2$/g: | 101 | 109 |
| ZSA Retention, % | 62.3 | 66.1 |
| After CPS 1000 ppm Ni/2000 ppm V | | |
| Surface Area, m$^2$/g: | 172 | 181 |
| MSA, m$^2$/g: | 77 | 79 |
| ZSA, m$^2$/g: | 95 | 102 |
| ZSA Retention, % | 58.6 | 61.8 |

It is also seen from Table 2 above that Catalyst 1 had better attrition resistance (i.e., lower DI) compared to that of Catalyst 2. This indicates that the peptized alumina-based catalyst made by combining soluble yttrium salt separately with the zeolite and peptized alumina has better attrition as compared to the conventional peptized alumina type catalyst made with a rare earth such as lanthanum based compound.

DI refers to Davison Attrition Index, which is an attrition resistance measurement known in the art. Briefly, the DI is defined as the quantity of <20-μm fines generated over a certain period of time. To determine the Davison Attrition Index (DI) of the invention, 7.0 cc of sample catalyst is screened to remove particles in the 0 to 20 micron range. Those remaining particles are then contacted in a hardened steel jet cup having a precision bored orifice through which an air jet of humidified (60%) air is passed at 21 liter/minute for 1 hour. The DI is defined as the percent of 0-20 micron fines generated during the test relative to the amount of >20 micron material initially present, i.e., the formula below.

DI=100×(wt % of 0-20 micron material formed during test)/(wt of original 20 microns or greater material before test)

Example 6

Catalyst 3 and 4 were deactivated using the protocol of CPS and no metals. Catalyst 3 made with the same yttrium compound as that used on Catalyst 1 and a conventional matrix alumina had similar DI and similar zeolite retention benefit as that exhibited by Catalyst 4, which was made with a lanthanum compound and the same conventional matrix alumina. See Table 3 below. The zeolite retention and attrition benefits from the addition of yttrium in the fashion illustrated therefore appear to be unexpectedly directed to those catalysts prepared from peptized alumina

TABLE 3

| Description: | | |
|---|---|---|
| | Catalyst 4: Comparative Sample from Conventional Matrix | Catalyst 3: Comparative Sample from Conventional Matrix |
| Chemical Analysis: | | |
| $Al_2O_3$, %: | 48.15 | 47.42 |
| $Na_2O$, %: | 0.33 | 0.41 |
| $RE_2O_3$, %: | 2.10 | 0.20 |
| $La_2O_3$, %: | 1.82 | 0.04 |
| $Y_2O_3$, %: | 0.06 | 1.34 |
| ABD, g/cm$^3$: | 0.72 | 0.70 |
| DI, -: | 3 | 3 |
| Before Deactivation | | |
| Surface Area, m$^2$/g: | 266 | 274 |
| ZSA, m$^2$/g: | 211 | 216 |
| MSA, m$^2$/g: | 56 | 58 |
| After CPS No Metals | | |
| Surface Area, m$^2$/g: | 172 | 176 |
| ZSA, m$^2$/g: | 131 | 134 |
| MSA, m$^2$/g: | 41 | 42 |
| ZSA Retention, % | 62.1 | 62.0 |

Example 7

Catalyst 1 and Catalyst 2 above were tested in Advanced Cracking Evaluation (ACE) unit after deactivation using deactivation protocols described above. The deactivated samples were evaluated in an ACE Model AP Fluid Bed Microactivity unit from Kayser Technology, Inc. See also, U.S. Pat. No. 6,069,012. The reactor temperature was 527° C. The results are summarized as follows.

The ACE results at conversion of 78, after deactivation with CPS and no metals, demonstrated that Catalyst 1 is more active (lowering the Cat-to-Oil by 1.31) and made more gasoline (1.39), less coke (0.35), and less bottoms (0.08) when compared to Catalyst 2. See Table 4 below.

TABLE 4

| Conversion 78 | | |
|---|---|---|
| | Catalyst 2 | Catalyst 1 |
| Deactivation | CPS No Metals | CPS No Metals |
| Catalyst to Oil Ratio | 6.59 | 5.28 |
| Hydrogen | 0.06 | 0.06 |
| Dry Gas | 1.86 | 1.74 |
| Total C3's | 6.55 | 6.23 |
| Total C4s | 13.57 | 12.98 |
| Gasoline | 52.30 | 53.69 |
| LCO | 17.79 | 17.87 |
| Bottoms | 4.21 | 4.13 |
| Coke | 3.72 | 3.37 |

The ACE results at conversion 70 after deactivation with CPS and 1000 ppm Ni/2000 ppm V metals demonstrated that Catalyst 1 is more active (lowering the Cat-to-Oil by 0.38), made less bottoms (0.42), and more LCO (0.42), when compared to Catalyst 2. See Table 5 below.

TABLE 5

| Conversion 70 | | |
|---|---|---|
| | Catalyst 2 | Catalyst 1 |
| Ni, ppm: | 1000 | 1000 |
| V, ppm: | 2000 | 2000 |
| Deactivation: | CPS | CPS |
| Catalyst to Oil Ratio | 6.02 | 5.64 |
| Hydrogen | 0.47 | 0.43 |
| Dry Gas | 2.21 | 2.17 |
| Total C3's | 4.57 | 4.63 |
| Total C4s | 9.45 | 9.40 |
| Gasoline | 49.83 | 49.53 |
| LCO | 23.38 | 23.80 |
| Bottoms | 6.62 | 6.20 |
| Coke | 4.55 | 4.51 |

What is claimed is:

1. A process for making a catalyst, the process comprising (a) combining peptized alumina, yttrium compound, and zeolite having catalytic activity in a fluid catalytic cracking process, and (b) forming an alumina-containing catalyst from the combination in (a),
wherein the yttrium compound is present in an amount ranging from about 0.5% to about 15% by weight, measured as an oxide ($Y_2O_3$) of the zeolite, and
wherein the zeolite is faujasite,
the yttrium compound is located within pores of the zeolite, and
a rare earth is present with a ratio of the rare earth to the yttrium compound in a range of not more than 0.5.

2. A process according to claim 1 wherein the peptized alumina is based on hydrated alumina.

3. A process according to claim 1 wherein the peptized alumina is based on pseudoboehmite or boehmite.

4. A process according to claim 1 wherein the peptized alumina is formed using acid selected from the group consisting of formic acid, nitric acid, acetic acid, hydrochloric acid, and mixture thereof.

5. A process according to claim 1 wherein alumina and acid are combined with an acid stable zeolite having catalytic activity in a fluid catalytic cracking process, wherein the alumina and the acid stable zeolite are combined under conditions sufficient to form peptized alumina in the presence of the yttrium compound and the acid stable zeolite.

6. A process according to claim 1 wherein the alumina-containing catalyst is formed by spray drying the combination in (a).

7. A process according to claim 6 wherein the spray drying is conducted at an inlet temperature in the range of 220° C. to 540° C.

8. A process according to claim 6 wherein the alumina-containing catalyst is in the form of particulate having an average particle size in the range of 20 to 150 microns.

9. A process according to claim 1 wherein the yttrium compound is an yttrium salt soluble in water or in acid.

10. A process according to claim 1 wherein the yttrium compound is selected from the group consisting of yttrium halide, yttrium nitrate, yttrium carbonate, yttrium sulfate, yttrium oxide and yttrium hydroxide.

11. A process according to claim 1 wherein the yttrium compound further comprises rare earth in a ratio by weight of rare earth oxide to yttrium oxide in the range of 0.01 to 1.

12. A process according to claim 1 wherein the zeolite is zeolite Y.

13. A process according to claim 1 wherein the zeolite is zeolite USY.

14. A process according to claim 1 wherein the catalyst contains essentially no divalent metal.

15. A process according to claim 1 wherein the yttrium and the zeolite are added to the combination in (a) as yttrium cation exchanged on the zeolite.

16. A process according to claim 15, wherein the yttrium exchanged zeolite is dried and calcined in the presence of steam.

17. A process according to claim 1 wherein the combination in (a) further comprises inorganic oxide other than alumina.

18. A process according to claim 17 wherein the inorganic oxide is selected from the group consisting of clay, silica, silica alumina, and bulk alumina.

19. A method of reducing loss of zeolite surface area in a zeolite containing catalyst prepared from peptized alumina and in a form suitable for fluidized catalytic cracking, the method comprising (a) forming peptized alumina,
(b) adding yttrium compound to a zeolite having catalytic activity in a fluid catalytic cracking process,
(c) adding peptized alumina to the zeolite before, during, and/or after addition of the yttrium compound to the zeolite, and
(d) forming a catalyst suitable for fluidized catalytic cracking,
wherein the yttrium compound is present in an amount ranging from about 0.5% to about 15% by weight, measured as an oxide ($Y_2O_3$) of the zeolite, and
wherein the zeolite is faujasite,
the yttrium compound is located within pores of the zeolite, and
a rare earth is present with a ratio of the rare earth to the yttrium compound in a range of not more than 0.5.

20. A method according to claim 19 wherein the peptized alumina is formed using an acid.

21. A method according to claim 20 wherein the acid is selected from the group consisting of formic acid, nitric acid, acetic acid, hydrochloric acid, and mixture thereof.

22. A method according to claim 19, wherein the yttrium and the zeolite are processed to produce yttrium exchanged zeolite, and the peptized alumina in (c) is added after the yttrium is exchanged onto the zeolite.

23. A method according to claim 22, wherein the yttrium exchanged zeolite is dried and calcined in the presence of steam prior to addition of peptized alumina.

24. A method according to claim 19 wherein the peptized alumina is based on hydrated alumina.

25. A method according to claim 19, wherein the peptized alumina is based on pseudoboehmite or boehmite.

26. A method according to claim 19 wherein the yttrium compound further comprise rare earth in a ratio by weight of rare earth oxide to yttrium oxide in the range of 0.01 to 1.

27. A method according to claim 17 wherein the catalyst suitable for fluidized catalytic cracking is formed by spray drying.

28. A method according to claim 27 wherein the catalyst suitable for fluidized catalytic cracking has an average particle size in the range of 20 to 150 microns.

* * * * *